United States Patent [19]

Butcher et al.

[11] Patent Number: 4,587,075
[45] Date of Patent: May 6, 1986

[54] METHOD AND APPARATUS FOR MAKING DIMENSIONALLY STABLE THERMOPLASTIC TUBULAR ARTICLES

[75] Inventors: Peter E. Butcher, Hinton Waldrist, Near Faringdon; David A. Dick, Wantage; James W. Nicholas, Wantage; Melvin E. R. Robinson, Wantage; Glyn Staines, Swindon, all of England

[73] Assignee: Metal Box p.l.c., Reading, England

[21] Appl. No.: 599,697

[22] Filed: Apr. 12, 1984

[30] Foreign Application Priority Data

Apr. 22, 1983 [GB] United Kingdom ............... 8310966

[51] Int. Cl.$^4$ ............................................. B29C 61/02
[52] U.S. Cl. .................................. 264/573; 264/521; 264/150; 264/230; 264/335; 264/342 R; 425/294; 425/393; 425/437; 425/446
[58] Field of Search ................... 264/150, 230, 342 R, 264/235.8, 289.6, 345, 335, 521, 573; 425/392–393, 437, 446, 294

[56] References Cited

U.S. PATENT DOCUMENTS

| 2,980,963 | 4/1961 | Makowski | 264/235 |
|---|---|---|---|
| 3,347,970 | 10/1967 | Hanna | 264/230 |
| 3,507,086 | 4/1970 | Barnes et al. | 264/150 |
| 3,716,606 | 2/1973 | Bazett | 264/235 |
| 3,761,550 | 9/1973 | Seefluth | 264/532 |
| 3,856,905 | 12/1974 | Dawson | 264/230 |
| 4,061,707 | 12/1977 | Nohtomi et al. | 264/95 |
| 4,229,929 | 10/1980 | Vajtay | 425/393 |
| 4,264,558 | 4/1981 | Jacobsen | 264/235 |
| 4,409,176 | 10/1983 | Jacobsen et al. | 425/525 |
| 4,464,106 | 8/1984 | Jacobsen et al. | 425/525 |
| 4,468,187 | 8/1984 | Nilsson et al. | 425/392 |

FOREIGN PATENT DOCUMENTS

| 2160786 | 7/1973 | France | 264/230 |
|---|---|---|---|
| 2177518 | 11/1973 | France . | |
| 55-142610 | 11/1980 | Japan | 264/342 R |
| 953734 | 4/1964 | United Kingdom . | |
| 2052367 | 1/1981 | United Kingdom . | |
| 2085798 | 5/1982 | United Kingdom . | |

*Primary Examiner*—Jeffery Thurlow
*Attorney, Agent, or Firm*—Burns, Doane, Swecker & Mathis

[57] ABSTRACT

For heat-setting tubular articles (such as can bodies) of an at least partly biaxially oriented crystallizable polymer, preferably a saturated linear polyester such as polyethylene terephthalate, e.g. for thermally processable food containers, a tube of the polymer is fitted over a mandrel and clamped at its ends to the mandrel at a temperature below the glass transition temperature of the polymer. The tube is then heated, e.g. by inserting a heater 28 into the interior of the mandrel, above the temperature to which it is to be heat-set (at least 60° C. above for PET) whereupon it shrinks into contact with the mandrel but is restrained from axial or further radial shrinkage. The tube and mandrel are cooled to below the heat-set temperature and the tube may then be cut into can body sections by knives engaging in circumferential grooves. Contact between the tube and mandrel is released, e.g. by forcing compressed air out through small holes in the mandrel surface to allow the tube and mandrel to be separated. Tubular bodies with one closed end can be heat-set on a mandrel with a correspondingly shaped end.

20 Claims, 6 Drawing Figures

METHOD AND APPARATUS FOR MAKING DIMENSIONALLY STABLE THERMOPLASTIC TUBULAR ARTICLES

BACKGROUND OF THE INVENTION

1. Field of the Invention

This invention relates to methods of making thermoplastic tubular articles which are dimensionally stable up to a specific elevated temperature from crystallisable polymers, and to the apparatus for making such articles, which articles are particularly tubular bodies of saturated linear polyester materials such as polyethylene terephthalate, intended for processable food and beverage containers.

2. Description of the Prior Art

It is known that biaxial drawing of a thermoplastic saturated linear polyester material, such as polyethylene terephthalate, can improve its mechanical properties while inducing a degree of biaxial orientation and crystallisation, without impairing the clarity of the material. The material will, however, shrink if heated above the temperature at which it was drawn. It is known that the tendency of biaxially drawn polyester film material to shrink can be decreased by annealing the material under restraint, utilising temperatures in the range 150° C. to 230° C., the process being known as heat setting. Biaxial drawing is also effected, for example, in the stretch-blow moulding of polyethylene terephthalate bottles. Another method of forming biaxially oriented tubular articles which may be used as bodies for processable food containers is disclosed in our copending U.K. Patent Application No. 8037137, published under No. 2089276A. The forming process described therein involves longitudinal stretching and radial expansion under internal fluid pressure within a mould and is normally carried out at a temperature in the range from 75° C. to 120° C. The tubular bodies thereby produced are dimensionally stable up to the temperatures encountered in many container filling operations, but a heat-setting treatment is necessary if the containers are to be filled with hot product (e.g. at 80° C. to 100° C.) or are to be subjected to pasteurisation (at about 60° C. to 100° C.) or sterilisation (at about 120° C.). Without such a heat-setting treatment, the thermoplastic linear polyester material (e.g. polyethylene terephthalate) would shrink and distort to an unacceptable degree during the hot filling or processing, as a result of relaxation of strained portions of the material back into their preferred state in which the molecular chains are coiled rather than extended. In the heat-setting treatment described in Specification No. 2089276A, the tubular articles were held for a time at a temperature at least equal to, and preferably somewhat greater than, the sterilisation or pasteurisation temperature whilst restraining them from shrinking beyond their desired circumferential and longitudinal dimensions. The restraint was provided by internal fluid pressure, so as to set the strained, oriented amorphous portions of the polyester material by at least partial crystallisation and relaxation. Internal fluid pressure cannot be conveniently used when the tubes have been cut so as to be open at both ends, and it is not convenient to combine the heat-setting with the forming process of our Specification No. 2089276A because it would involve additional complication and extended process times.

European patent application published under No. 0081451 discloses a heat-setting process and apparatus for making closed-ended containers from PET. The process comprises deep-drawing a pre-heated sheet of PET into a heated female mould by means of a male plug, which is at a temperature below the glass transition temperature (Tg) of the PET. The mould is kept at a temperature above Tg, typically 140° C. Air pressure introduced around the plug is used to blow the plug-formed article into contact with the mould for heating it above Tg. When it has been in contact with the mould for long enough to be heat-set, it is allowed to shrink back into contact with the plug which restrains it from further shrinkage and cools it to a temperature below the heat-set temperature. Contact between the heat-set article and the plug can be released by forcing air through an axial passage in the plug. In this process the heat-setting is essentially carried out while the article is held against the female mould by internal gas pressure, rather than when it is restrained from axial shrinkage by the plug. The heat-set operation cannot be carried out independently of the biaxial drawing, and is clearly not applicable for heat-setting open-ended tubes.

SUMMARY OF THE INVENTION

According to the present invention, a method of making a thermoplastic tubular article, including heat-setting the article so that it will be dimensionally stable up to a specific elevated temperature, characterised by the steps of fitting an at least partly biaxially oriented tube of a crystallisable polymer over a mandrel whose outer diameter is only slightly less than the internal diameter of the tube and clamping the tube to the mandrel to restrain axial shrinkage of the tube, while maintaining the temperature of the tube and mandrel below the glass transition temperature of the polymer, heating the tube to a temperature higher than the said specific elevated temperature so that the tube shrinks radially into contact with the mandrel but is restrained from further radial shrinkage, maintaining the tube at said higher temperature for a time sufficient to ensure the required degree of dimensional stability, cooling the tube and mandrel to a temperature below the said specific elevated temperature, and then releasing the contact between the tube and mandrel to allow them to be separated.

The heat-setting operation is thus effected independently of the forming operation and does not cause problems therein. A residual linear shrinkage of up to 3% is usually found after heat-setting, but it can be eliminated by a further step of re-heating the article to the specific elevated temperature without internal restraint against shrinkage. Such residual shrinkage may be used to eliminate or reduce head space in a container having a body heat-set by the method of the invention.

Where the polymer is a saturated linear polyester, the temperature to which the tube is heated on the mandrel is preferably at least 60° higher than the specific elevated temperature, and in particular, where polyethylene terephthalate is used, the specific elevated temperature is preferably about 120° C. and the tube is heated to at least 180° C. on the mandrel.

The degree of dimensional stability which is achieved depends on the temperature to which the tube is heated on the mandrel (the "heat-setting temperature") and the time for which the tube is maintained at this temperature, and it may be adjusted to the particular requirements for which the tubular articles are made. For example, if it is desired that the linear dimensions of the article should not alter by more than 3% when it is heated to a specific elevated temperature of 120° C., the tube may be heated at 180° C. for a period of 1 to 5 minutes or, preferably, at 240° C. for 12 to 15 seconds.

The contact between the tube and mandrel may be released by forcing fluid (e.g. air) under pressure from inside the mandrel through small holes in its surface to form an fluid cushion between the tube and mandrel. Alternatively it may be released by collapsing at least a part of the mandrel surface inwards.

The tubular article may be given a shape which departs from that of a plain cylindrical tube by providing the mandrel with a complementary shape, which is adopted by the tube as it shrinks on to the mandrel. For example, the tubular article may be formed with circumferential beads by providing the mandrel with corresponding circumferential projections. Other shapes may be produced in this manner, such as tapered, barrelled or waisted tubes, or tubes of rectangular, oval or other cross-sections.

When making a tubular article which is open at both ends, the clamping is preferably effected by circumferentially clamping both ends of the tube to the mandrel. The tube may then be cut into individual lengths before it is separated from the mandrel. For example, the tube may be cut by knives which penetrate through the tube material into circumferential grooves in the mandrel as the mandrel is rotated.

When making a tubular article which is closed at one end, preferably a mandrel is used which has a correspondingly shaped closed end and clamping is effected by clamping the other, open end of the tube to the mandrel. The open end of the tube may be clamped axially against a radially extending flange on the mandrel. Preferably the closed end of the tube is additionally clamped axially against the closed end of the mandrel.

In a preferred embodiment of the invention, using a plurality of vertical hollow mandrels of high thermal conductivity, each mandrel is indexed past operating stations at which:

(a) the tube is fitted over the mandrel, whose temperature is below the glass transition temperature of the polymer,
(b) clamps are applied to the tube to clamp it to the mandrel,
(c) a heating element is introduced into the interior of the mandrel to heat it to a temperature at least 60° C. higher than the specific elevated temperature,
(d) the said higher temperature is maintained for a time sufficient to ensure the required degree of dimensional stability,
(e) the heating element is removed, and the tube is cooled to below the specific elevated temperature,
(f) the clamps are released,
(g) the ends of the mandrel are sealed and air under pressure is introduced into it and forced out through small holes in its surface to release contact between the tube and the mandrel, and
(h) the tube is removed from the mandrel.

Where the tube is long enough to make several open-ended articles (e.g. container bodies), it is convenient to arrange that, after cooling of the tube, the mandrel is rotated and knives are brought into contact with the tube to cut it into individual lengths.

The invention also resides in apparatus for making a thermoplastic tubular article of a crystallisable polymer, e.g. a saturated linear polyester material, which is heat-set so as to be dimensionally stable up to a specific elevated temperature, comprising heating means for heating the article to a temperature higher than the specific elevated temperature, characterised by a mandrel and clamping means for clamping an at least partly biaxially oriented tube of the crystallisable polymer to the mandrel to restrain axial shrinkage of the tube.

BRIEF DESCRIPTION OF THE DRAWINGS

FIG. 5 is a perspective view of a thermally processable container with a body heat-set by the method of the invention on a mandrel as shown in any one of FIGS. 1 to 4.

DETAILED DESCRIPTION OF THE PREFERRED EMBODIMENTS

The embodiments of the invention illustrated in FIGS. 1 to 4 are particularly concerned with the production of tubular bodies of biaxially oriented polyethylene terephthalate (PET) for thermally processable food containers as illustrated in FIG. 5, which have end closures seamed to the ends of the body. The tubular bodies, open at both ends, are made from tubes of at least partly biaxially oriented PET produced by the process disclosed in our prior British Patent Application No. 8037137 (Publication No. 2089276A). As explained above, it is necessary to carry out a heat-setting treatment on the oriented PET tube to ensure that the containers will be able to withstand hot-filling, pasteurisation or sterilisation processes at temperatures of from 60° C. to 120° C., without unacceptable shrinkage. In practice, it is a requirement that the container bodies have sufficient dimensional stability to match the end closures in a precise manner for the production of gas-tight seams and to avoid stressing the seams excessively through subsequent shrinkage.

Figure 1:
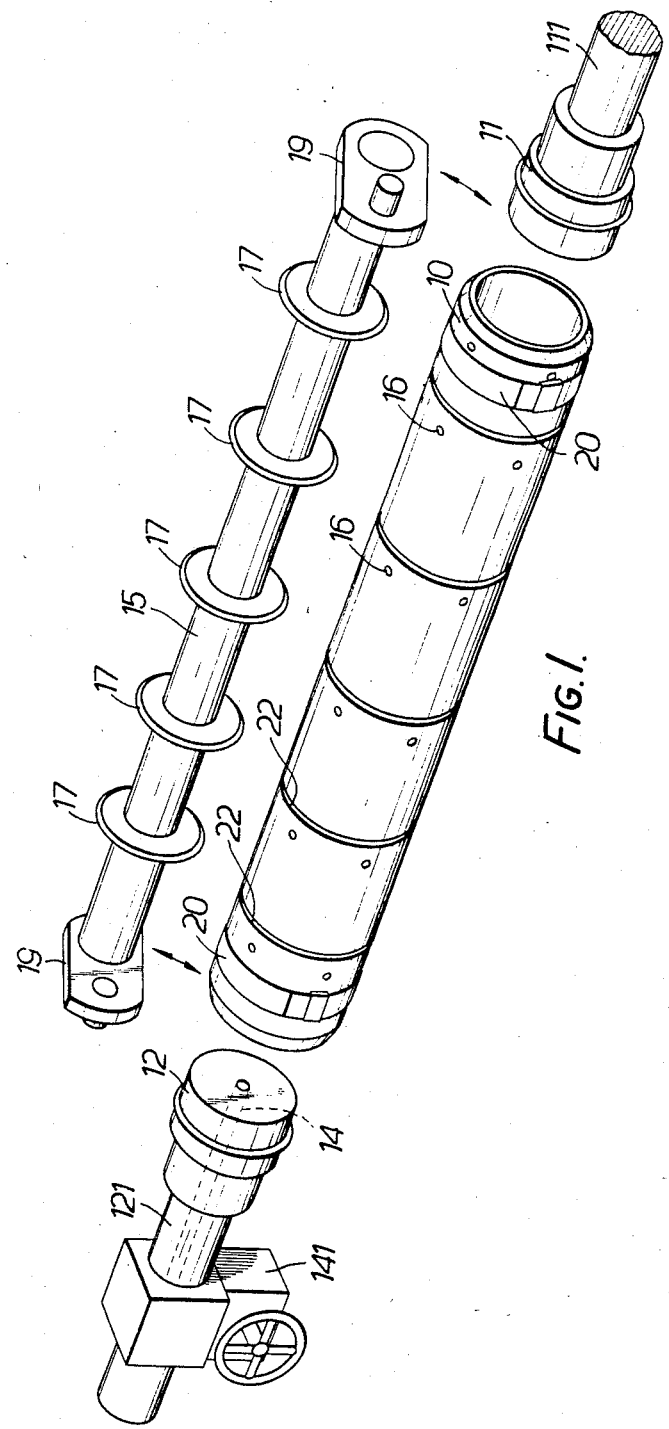
FIG. 1 is a diagrammatic perspective view of apparatus including a mandrel for use in heat-setting tubular bodies for making multiple container bodies by the method of the invention.

FIG. 1 illustrates apparatus including a mandrel on which the heat-setting process can be carried out in accordance with the invention. The cylindrical mandrel body 10 is hollow and its ends are closed by end plugs 11 and 12 carried by rotatable shafts 111 and 121 which can be shifted axially to enable the mandrel to be removed. Plug 12 and shaft 121 have an inlet passage 14 and control valve 141 for compressed air. The mandrel body 10 is provided with a plurality of small holes 16 in its surface. At each end, it is provided with a circumferential clamp member, e.g. in the form of a snap-action clip or clamping band 20. Circumferential grooves 22, approximately 1 mm. in width, are formed in the surface of the mandrel body 10 at intervals corresponding to the length of the container bodies to be produced. A shaft 15 carrying rotary knives 17 is mounted parallel to the mandrel 10 on pivotal brackets 19 so as to be capable of being shifted towards the mandrel so that the knives 17 can enter into the grooves 22.

Figure 2:
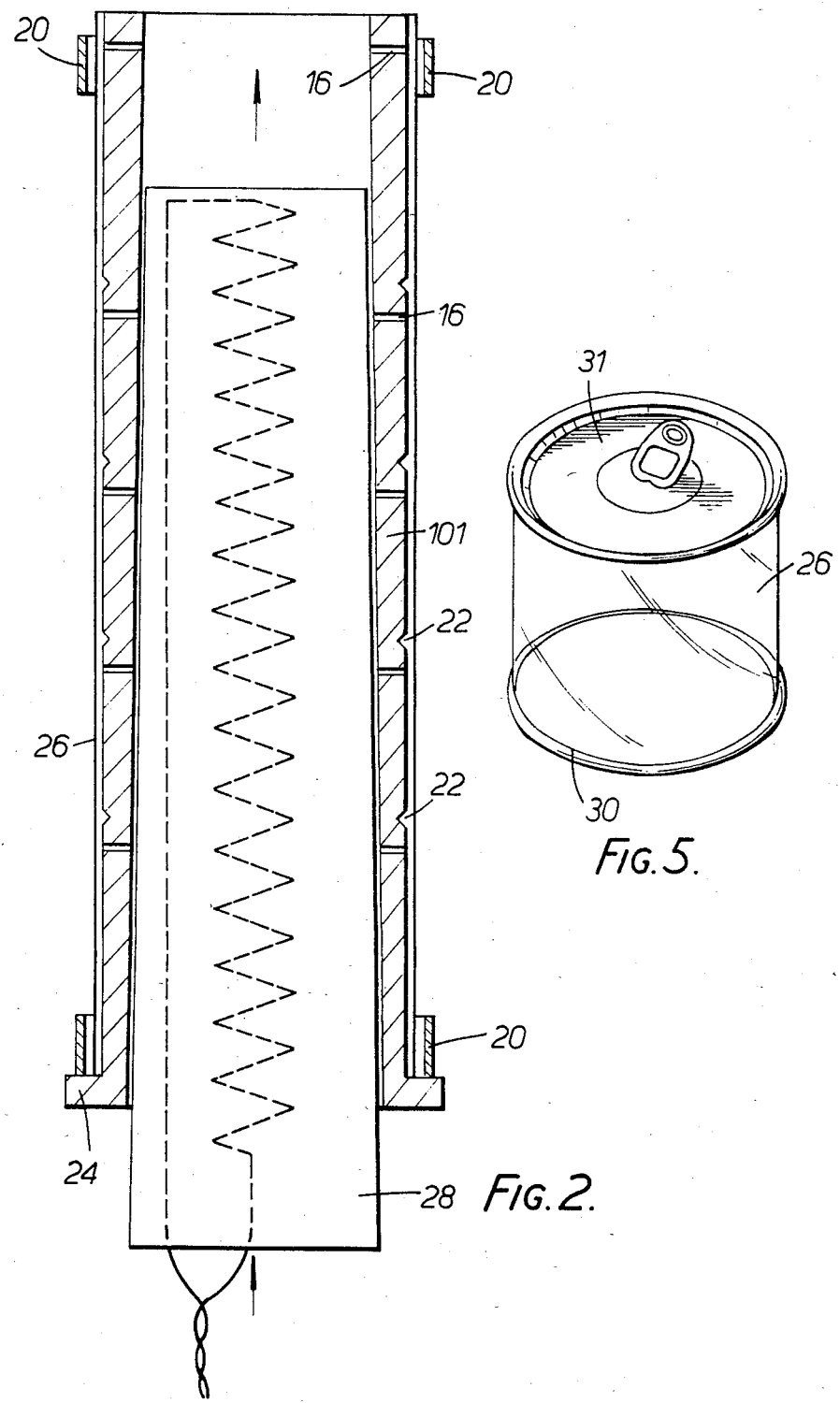
FIG. 2 is a diagrammatic sectional view of a modified form of the mandrel, showing a heating element inserted therein.

FIG. 2 illustrates an alternative form of mandrel body 101 in the vertical position. The foot of the body 101 has a flange 24 to support a tube 26 of at least partially biaxially oriented PET resin. The outer diameter of the mandrel body 101 is clearly shown to be only very slightly less than that of the PET resin tube 26, so that the latter can be fitted thereover without excessive friction but also without substantial play. In this embodiment, the mandrel body 101 is made of a material of high thermal conductivity but is sufficiently thin in section to have a small thermal capacity. The interior of the mandrel body 101 is slightly tapered towards the top so as to make contact with a correspondingly shaped heating element 28 when the latter is inserted from below, as shown in FIG. 2, to fill the interior of the mandrel.

Figure 3:
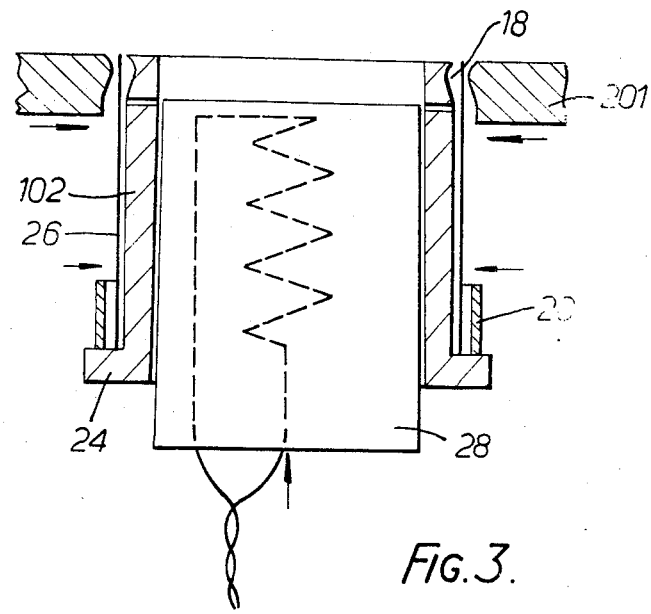
FIG. 3 is a view similar to FIG. 2 of a further form of mandrel for heat-setting single container bodies.

FIG. 3 illustrates a mandrel body 102 which is similar to that of FIG. 2 but of lesser height, for production of single container bodies. In this case, a circumferential groove 18 is provided at the upper end of the mandrel body 102 to co-operate with clamping members 201 in the form of laterally movable half-rings.

In use of the mandrels of FIGS. 1 to 3, when a PET tube 26 has been fitted over the mandrel body 10, 101 or 102, and the ends of the tube 26 have been clamped by means of clamp members 20, the temperature of the mandrel and tube is raised, e.g. by introduction of the heating member 28 of FIGS. 2 and 3, from an initial temperature below the glass transition temperature of the resin to a temperature which is at least 60° C. above the specific elevated temperature, up to which the can bodies are to be dimensionally stable. The temperature to which the mandrel is heated may range from 125° C. to 240° C., for heat-setting the PET tube up to specific elevated temperatures ranging from 65° C. to 180° C., but it is preferably from 180° C. to 240° C., at which the rate of annealing of the PET resin is sufficiently high to obtain rapid heat-setting. Using a temperature of 240° C., it is only necessary to ensure that the whole of the PET resin attains this temperature for about 12 to 15 seconds. Temperatures above 240° C. should preferably not be used because the material can become cloudy and embrittled. The PET tube 26 shrinks radially into contact with the mandrel 10, 101, or 102 but is restrained from any substantial radial or axial shrinkage by the mandrel and the clamps 20, 201. The supply of heat is then stopped, e.g. by withdrawing the heating member 28, and the tube and mandrel are then allowed to cool to a temperature below the said specific elevated temperature (i.e. the temperature to which the tube has been heat-set).

In the cases of FIGS. 1 and 2, the mandrel bodies 10, 101 are now rotated and the knives 17 (FIG. 1) are brought into contact with the rotating PET tube 26 so as to penetrate through the tube material into the circumferential grooves 22 and thereby cut the tube into individual can body lengths. In the case of FIG. 3 this step is unnecessary, but the groove 18 and clamp members 201 form a circumferential groove in the top of the body to facilitate subsequent seaming of an end closure to it.

Finally the clamp members 20, 201 are released, the ends of the mandrel body 10, 101, 102 are sealed, e.g. by the end plugs 11, 12 of FIG. 1, and compressed air is admitted into the mandrel body, e.g. through the valve 141 and inlet 14, being then forced out of the holes 16 so as to release contact between the tube and mandrel by an air cushion effect. The can body or body sections are then removed from the mandrel.

Figure 4:
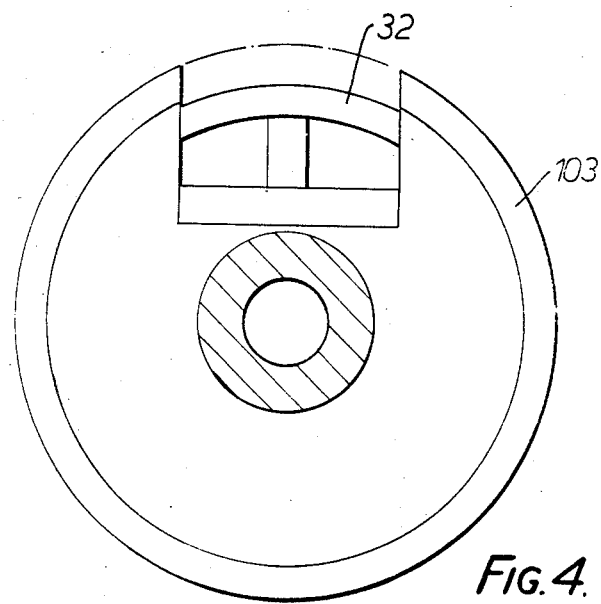
FIG. 4 is a diagrammatic cross-sectional view showing a modification of the mandrels of FIGS. 1, 2 or 3.

Instead of using compressed air to release the contact between the tube and mandrel, a part of the mandrel surface may be collapsed inwards as shown in FIG. 4. The mandrel body 103 is here provided with one or more sections 32 extending the whole length of the mandrel and movable radially from the position shown in chain-dotted lines to that shown in full lines to collapse a part of the mandrel surface, so reducing the effective circumference and releasing contact with a PET tube which has been heat-shrunk thereon. An alternative type of collapsible mandrel which could be used is a hydraulically or pneumatically inflated tube, e.g. of silicon rubber.

As shown in FIG. 5, can ends 30, 31, e.g. of metal, can conveniently be seamed to the ends of the heat-set tubular can body 26 to form a processable container.

In production, a plurality of mandrel bodies 101 or 102 are arranged vertically on an indexing platform so as to be indexed past stations at which the various operations are carried out, as follows:

(a) a PET tube (26) is fitted over a mandrel body 101 or 102 while the temperature of the mandrel is below the glass transition temperature of the resin,
(b) the circumferential clamps 20, 201 are applied to each end of the PET tube 26,
(c) the heating element 28 is introduced from below into the interior of the mandrel body so as to make contact with it and to heat it rapidly by conduction to a temperature of 180° C. to 240° C.,
(d) this temperature is maintained for long enough to ensure the required heat-setting,
(e) the heating element 28 is removed and the PET tube 26 is allowed to cool to below 140° C.,
(f) where a multiple-length mandrel body 101 is used, the mandrel body is rotated and knives are brought into contact with the tube 26 to cut it into individual lengths,
(g) the ends of the mandrel body 101 or 102 are sealed and compressed air is introduced to release contact between the tube 26 and mandrel body, and
(h) the can body sections are removed from the mandrel body.

Figure 6:
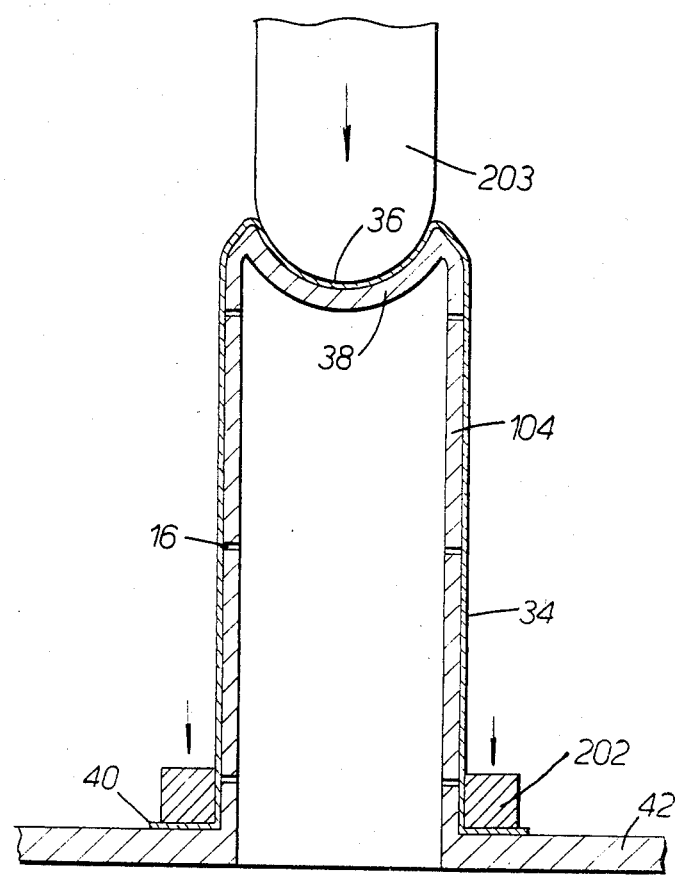
FIG. 6 is a diagrammatic sectional view of another form of mandrel for use in heat-setting tubular bodies which are closed at one end.

The method of the invention can also be employed for heat-setting thermoplastic tubular articles which are closed at one end. FIG. 6 illustrates the heat-setting of a PET container 34 which is formed with a recessed bottom 36. The container 34 is shown inverted on a tubular mandrel 104 which has a closed end 38 whose shape corresponds with that of the container bottom 36. The clamping means in this case comprise a clamp ring 202 which is movable axially of the mandrel to clamp a flange 40 on the end of the container 34 against a base plate 42, and a pressure member 203 with an end shaped to correspond with the shape of the container bottom 36, which is movable axially to clamp the container bottom against the closed end 38 of the mandrel body. The mandrel body 34 is formed with air holes 16 as in the embodiments of FIGS. 1, 2 and 3 for removal of the heat-set container. Heating may be effected by a heating element 28 as before.

Alternative means of heating the PET tube may be used in any of the embodiments described above, such as inductive heating of a metal mandrel, using an induction coil within the mandrel. Dielectric radio-frequency heating of the PET tube may be employed, using inner and outer electrodes, the mandrel then forming a heat sink to receive heat from the PET tube as it cools down. Radiant heat, e.g. in the infra-red region, may be used, or the mandrel and tube may be introduced into a fluidised bed maintained at the desired temperature.

Other alternatives are heating of the interior of the mandrel by flame, and interior or exterior heating by hot air or by live steam.

The mandrel need not be cylindrical but could for example be oval or rectangular in section, so as to use the heat-setting shrinkage for accurate dimensioning of shaped tubes.

We claim:

1. A method of making a thermoplastic tubular article which will be dimensionally stable up to a specific elevated temperature, comprising the steps of fitting an at least partly biaxially oriented tube of a crystallisable polymer having at least one open end over a mandrel whose temperature is below the glass transition temperature of the polymer and whose outer diameter is only slightly less than the internal diameter of the tube, clamping the tube to restrain axial shrinkage thereof, heating the mandrel internally to heat the tube to a temperature higher than the said specific elevated temperature so that, whilst restrained against axial shrinkage, the tube shrinks radially into contact with the mandrel but is restrained thereby from further radial shrinkage, maintaining the tube at said higher temperature for a time sufficient to ensure the required degree of dimensional stability, cooling the tube to a temperature below the said specific elevated temperature, releasing contact between the tube and mandrel by forcing fluid under pressure from inside the mandrel through a plurality of apertures in its surface to form a fluid cushion between the tube and mandrel, and removing the tube from the mandrel while the fluid cushion is in existence.

2. A method according to claim 1, wherein the tube is subsequently re-heated to the specific elevated temperature without restraint to remove residual shrinkage.

3. A method according to claim 1 or claim 2, wherein the polymer is a saturated linear polyester and the temperature to which the tube is heated on the mandrel is at least 600° C. higher than the specific elevated temperature.

4. A method according to claim 3, wherein the polymer is polyethylene terephthalate, the specific elevated temperature is about 120° C., and the tube is heated to at least 180° C. on the mandrel.

5. A method according to claim 4, wherein the tube is heated to about 240° C. on the mandrel for a period not exceeding 15 seconds.

6. A method according to claim 1, wherein the tubular article is given a shape which departs from that of a plain cylindrical tube by providing the mandrel with a complementary shape, which is adopted by the tube as it shrinks on to the mandrel.

7. A method according to claim 6, wherein the tubular article is formed with circumferential beads by providing the mandrel with corresponding circumferential projections.

8. A method according to claim 1 of making a tubular article which is open at both ends, wherein the clamping is effected by circumferentially clamping both ends of the tube.

9. A method according to claim 8, wherein the tube is cut into individual lengths before its contact with the mandrel is released.

10. A method according to claim 9, wherein the tube is cut by knives which penetrate through the tube material into circumferential grooves in the mandrel as the mandrel is rotated.

11. A method according to claim 1 of making a tubular article which is closed at one end, wherein a mandrel is used which has a correspondingly shaped closed end and clamping is effected by clamping the other, open end of the tube to the mandrel.

12. A method according to claim 11, wherein the open end of the tube is clamped axially against a radially extending flange on the mandrel.

13. A method according to claim 11 or claim 12, wherein the closed end of the tube is additionally clamped axially against the closed end of the mandrel.

14. A method according to claim 3, wherein the polymer is a saturated linear polyester and the temperature to which the tube is heated on the mandrel is at least 60° C. higher than the specific elevated temperature, using a plurality of vertical hollow mandrels of high thermal conductivity, characterised in that each mandrel is indexed past operating stations at which:
 (a) the tube is fitted over the mandrel, whose temperature is below the glass transition temperature of the polymer
 (b) clamps are applied to the tube to restrain it axially,
 (c) a heating element is introduced into the interior of the mandrel to heat it to a temperature at least 60° C. higher than the specific elevated temperature,
 (d) the said higher temperature is maintained for a time sufficient to ensure the required degree of dimensional stability,
 (e) the heating element is removed, and the tube is cooled to below the specific elevated temperature,
 (f) the clamps are released,
 (g) the ends of the mandrel are sealed and air under pressure is introduced into it and forced out through small holes in its surface to release contact between the tube and mandrel, and
 (h) the tube is removed from the mandrel.

15. A method according to claim 14, wherein, after cooling of the tube, the mandrel is rotated and knives are brought into contact with the tube to cut it into individual lenghts.

16. Apparatus for making a thermoplastic tubular article of a crystallisable polymer which is heat-set so as to be dimensionally stable up to a specific elevated temperature, comprising a mandrel having a plurality of apertures in its surface; heating means for heating the mandrel internally and thereby heating the article to a temperature higher than the specific elevated temperature; clamping means for clamping an at least partly biaxially oriented tube of the crystallisable polymer to restrain axial shrinkage of the tube; and a pressurised fluid supply for supplying fluid under pressure from inside the mandrel through said plurality of apertures in its surface, to release contact between the mandrel and a tube shrunk thereon.

17. Apparatus as claimed in claim 16, wherein the mandrel is hollow and is made of a material of high thermal conductivity, and the heating means comprises a heating element which can be inserted into the hollow mandrel.

18. Apparatus as claimed in claim 17, wherein the interior of the mandrel is slightly tapered towards one end so as to make contact with a correspondingly shaped heating element inserted from the other end.

19. Apparatus as claimed in claim 16, wherein the mandrel is provided with circumferential projections so as to form circumferential beads in the shrunk tube.

20. Apparatus as claimed in claim 16, for making multiple container bodies, wherein the surface of the mandrel is provided with a plurality of circumferential grooves and is mounted for rotation about its axis, the apparatus further comprising a set of parallel knives which can be moved towards the mandrel and received within said grooves, for cutting a polymer tube which is on the mandrel.

* * * * *